United States Patent Office 3,438,960
Patented Apr. 15, 1969

3,438,960
LIGNOSULFONAMIDE AND A PROCESS FOR ITS PREPARATION
Chung Sul Youn Kim, Bellingham, Wash., assignor to Georgia-Pacific Corporation, Portland, Oreg., a corporation of Georgia
No Drawing. Filed Oct. 1, 1965, Ser. No. 492,296
Int. Cl. C07g 1/00; C11d 1/30; C07c 143/72
U.S. Cl. 260—124　18 Claims

ABSTRACT OF THE DISCLOSURE

A lignosulfonamide composition useful as a surface active agent prepared by reaction of a lignosulfonate with an acid halide and an amine.

---

This invention pertains to a new composition, more particularly to a lignosulfonamide and a process for its preparation.

Lignin is a polymeric substance of substituted aromatics found in plant and vegetable tissue associated with cellulose and other plant constituents. In the pulp and paper industry, lignin-containing materials such as wood, straw, corn stalks, bagasse, and other vegetable and plant tissues are processed to recover the cellulose or pulp with lignin being obtained as a by-product. Since vegetable and plant tissues generally contain appreciable amounts of lignin, large amounts of lignin are available. Considerable effort has been expended to find ways to more fully utilize the chemical properties and values of lignin. Lignin and lignosulfonates have been used as dispersing agents but have found only limited fields of application for such use due to the properties of the products.

It is therefore an object of this invention to provide a process for the treatment of residual pulping liquors or lignin so that the chemical value of the product can be utilized. A further object is to provide an improved surface active agent and a method of enhancing the surface active properties of lignin. A still further object is to provide a lignosulfonamide and a method for its preparation.

The above and other objects are attained by interacting sulfonated lignin with an acid halide selected from the group consisting of thionyl halides, phosphorus halides and phosphorus oxyhalides. The reaction product of the sulfonated lignin and the acid halide is then reacted with an amine having the general formula:

where $R_1$ represents hydrogen or a methyl radical and $R_2$ and $R_3$ represent the same or different radicals selected from the group of hydrogen, alkyl radicals up to 30 carbon atoms, aryl radicals having up to 4 benzene rings, and arylalkyl radicals having up to the total of 30 carbon atoms. Various lignosulfonamides may be thus prepared by using different amines as reactants.

It is essential that the lignin be sulfonated prior to reaction with the acid halide. In some of the pulping processes, for example, the sulfite pulping process, the residual pulping liquor is a sulfonated product and the lignin in the product is sulfonated. In other processes, the residual pulping liquor or the lignin-containing product as obtained from the process may not be a sulfonated product. However, the residual liquors or products containing the lignin portion may be sulfonated by various known methods to the degree desired, including further sulfonation of a sulfite pulping liquor, by reaction, for example, with a bisulfite or sulfite. Residual pulping liquors obtained in an alkaline process of digestion of lignocellulosic materials, "akali lignin" obtained by pulping of lignocellulosic materials with alkali, "hydrolysis lignin" obtained by the hydrolysis of lignocellulosic materials in the manufacture of wood sugars, and "hydrotropic lignins" derived from hydrotropic pulping processes, or lignin obtained from any source may thus be sulfonated and used in the formation of the lignosulfonamide. Also, lignosulfonates or residual pulping liquors which have been altered somewhat by further processing or treatment such as an acid treatment, alkaline treatment, heat treatment, oxidation with acids as well as other oxidizing agents, and other treatments are operative as long as the lignin constituents retain their basic phenylpropane polymeric structure of lignin to have the general properties and characteristics associated with lignin products.

In the separation of lignin from the lignocellulosic material, other constituents besides lignin are generally obtained in the lignin-containing product. For example, spent sulfite liquor generally contains about 40 to 60 weight percent of lignosulfonate with the remainder being carbohydrates and other organic and inorganic compounds dissolved in the liquor. Lignin products obtained by other processes will likewise contain other materials such as carbohydrates, degradation products of carbohydrates and resinous materials which may remain after sulfonation. The main disadvantage of some of the non-lignin constituents such as sugars is that they may react with reagents resulting in the utilization of the reactants. Thus, generally the lignosulfonate constituents are separated from the non-lignin products prior to reaction with the acid halide. Lignin products such as a sulfonated residual pulping liquor may be subjected to different treatments, such as, for example, acid, alkaline or heat treatments as well as reaction with other chemicals or oxidation to remove or modify some of the non-lignin constituents or for other purposes. The lignin constituents may be affected to a certain extent by such treatments but this is not detrimental as long as the treatment is not so severe as to destroy the basic phenylpropane polymeric structure of the lignin and properties characteristic of these products. For example, a spent sulfite liquor may be oxidized as in the preparation of vanillin. The vanillin raffinate obtained will generally contain lignosulfonates which may be altered somewhat but which still retain the basic properties and characteristics associated with lignosulfonates. It is generally preferred to recover the lignosulfonates from the lignin products by solvent extraction or by precipitation with an alkaline earth hydroxide, an acid, or an amine. Other known methods, however, may also be used, some of which are ion exchange, dialysis and electrodialysis.

The recovered lignosulfonate may be treated further to reduce the average molecular weight of the product. The lignosulfonates having molecular weights in the range such that the diffusion coefficient is in the range of 14 to 20 mm.$^2$/day (as determined by the agar gel method as described in J. Am. Chem. Soc. Vol. 81, 2045 by J. Moacanin et al.) form amides which are more readily soluble in oil and effective as dispersants or emulsifiers. If desired, the lignosulfonate product may be fractionated to recover the low molecular weight products. However, it is generally preferred to treat the lignosulfonate product as obtained to reduce the average molecular weight prior to the forming of the amide. This may be done by using the various known methods, for example, prehalogenation of the lignosulfonate or resulfonation under conditions to obtain the reduced molecular weight. In the halogenation, halogen gases such as chlorine or bromine may be used or other halogenating agents employed which result in the formation of elemental bromine or chlorine under the treatment conditions.

In reacting the sulfonated lignin or lignosulfonate with the halogen, such as chlorine or bromine, advantages in addition to just lowering the molecular weight are obtained. A halogenated lignosulfonate is obtained having halogen substitutions most likely on the aromatic rings of the lignin which is not obtained by the reaction with the acid halide.

Thionyl halides such as the chloride or bromide are generally used in the reaction with thionyl chloride being preferred due to its availability. The phosphorus halides such as phosphorus penta- or trichloride or bromide as well as phosphorus oxyhalides may likewise be used; but these reagents produce residual inorganic compounds which may be troublesome to eliminate.

The reaction of the lignosulfonate with the acid halide is carried out in a non-aqueous medium preferably under substantially anhydrous conditions and in a medium in which the particular lignosulfonate is soluble. Thionyl chloride is a good solvent for many lignosulfonates and thus may be used also as a reaction medium. In the reaction, it is not necessary that the conditions be anhydrous, since any water present will react with the acid halide until the system becomes substantially anhydrous. Preferably, the reaction is carried out under reflux so that the gaseous reaction products will be expelled from the system. A low boiling solvent or medium is generally preferred to permit the reaction mixture to be refluxed at temperatures below the decomposition point of the reactants or products without having to employ reduced pressures.

The lignosulfonate must be at least partially soluble in the solvent to effect the reaction with the acid halide. Since there are relative few non-aqueous solvents, such as, for example, dimethyl sulfoxide, which will dissolve metal salts of lignosulfonate, the lignosulfonate is generally converted to the acid form or an amine salt for which more readily available solvents such as dioxane, tetrahydrofuran, polyhalogenated alkanes as chloroform, carbon tetrachloride and tetrachloroethylene and polyhalogenated aromatics as chlorobenzenes, chlorxylenes and chlorotoluene may be used. The term "lignosulfonate," as used herein, means lignosulfonate in its acid form as well as the salts thereof.

Since a common method of recovering lignosulfonates from a sulfonated lignin-containing material or pulping liquor is by precipitation of the sulfonated lignin as an amine salt, the amine salts of lignosulfonates are preferably used for the reaction with the acid halide. The formation of the amine salt is usually obtained by the addition of an organic amine to a lignosulfonate-containing aqueous solution, which, under acid conditons, will result in the precipitation of an amine lignosulfonate formed. A primary, secondary or tertiary amine may be used. Alkyl amines having from 3 to 30 carbon atoms are preferred, although other amines such as aryl amines as aniline and aniline derivatives may be used. Illustrative examples of the amines which may be used are triamylamine, fatty amines, dioctylamine, N,N-dimethyl-octadecylamine and p-octylaniline.

The amount of the acid halide intermixed with the lignosulfonate may be widely varied. Generally, it is preferred to use sufficient amount of the reactant to react with at least 50% of the sulfonate radicals present in the lignosulfonate, preferably from at least about 80% to the stoichiometric amount to react with the sulfonate radicals. Since the lignosulfonates may contain moisture and other constituents even though purified which may utilize some of the acid halide, a 10 to 20% stoichiometric excess or more is often used. When a large excess of the acid halide is used, some halogen substitution may be obtained on the lignin molecule replacing the hydroxyl groups, especially at a reaction temperature above about 50° C. These halogen substitutions generally remain when the product is converted to the amide.

While the acid halide will react with the sulfonated lignin at room temperature, it is generally preferred to heat the reaction medium to a temperature in the range of from 50° to 70° C. or up to the decomposition points of the reactants. The reaction of the acid halide with the sulfonated lignin is rapid, increasing appreciably with an increase in temperature. At the preferred temperatures of 50° to 70° C., generally a reaction time of 2 to 4 hours is used. However, the reaction time of ¼ to 24 hours may be employed. After the reaction, the solvent or excess reactant such as thionyl chloride, if used as a reaction medium, is flashed off. The reaction product may be washed with fresh inert solvent and then dried at reduced temperature. If the product is to be stored before being reacted with the amine to form the lignosulfonamide, it is preferred to redissolve the product in fresh anhydrous, inert solvents and kept at a low temperature. While the dry product is relatively stable, if may undergo some condensation if stored for a considerable length of time.

However, it is not necessary to recover the acid halide-lignosulfonate reaction product from the reaction mixture. The organic amine which is to be reacted with the product to obtain the sulfonamide may be just added to the reaction mixture. This is especially true when the reaction medium used is one in which the amine is soluble.

Any primary or secondary amine, including ammonia, may be reacted with the acid halide treated intermediate product to form the lignosulfonamide. Saturated and unsaturated alkyl and cyclic amines as well as aryl amines having up to four benzene rings may be used. Likewise, diamines and triamine may be employed. The type of amines affects the surface active properties of the amide obtained and thus products of different properties may be obtained by the reaction of different amines. When the lignosulfonamide, as in an oil base drilling fluid, is to be used as an emulsifying agent, especially for water in oil, primary and secondary alkyl amines having from 5 to 20 carbon atoms are generally used. Long alkyl radicals increase the solubility of the lignosulfonamide in oil which improves the emulsifying properties. Illustrative examples of the amines which may be used are fatty amines purified or mixed, dodecylamine, hexamethylenediamine, aniline, piperidine, dioctylamine, benzylamine, N-methyldioctylamine and 2-ethyloctylamine.

The reaction of the amine with the acid halide treated lignosulfonate is carried out in a solvent preferably under substantially anhydrous conditions. Illustrative examples of the solvents which may be used are those used for the acid halide reaction except that the acid halides are not used.

The reaction may be carried out at room temperatures but it is generally preferred to heat the reaction mixture to a temperature of 30 to 70° C. The rate of reaction increases appreciably with an increase in temperature. At the preferred temperatures, a reaction time of 1 to 3 hours is used. However, substantial reaction can be obtained in a time less than ¼ of an hour, and the reaction time can also be extended to 24 hours or more. After the reaction, generally the solvent is flashed off and the product washed with ether or other solvents to remove the unreacted amine and to purify the lignosulfonamide.

The ratio of the amine intermixed with the acid halide treated intermediate product is generally in the range of 80 to 250% of the stoichiometric amount of amine necessary to react with the sulfonyl chloride present in the acid halide treated intermediate. The amount of amine used may be as little as 80% of the sulfonyl chloride groups but usually more than 200% may be used to obtain a 100% conversion to the lignosulfonamide.

The product obtained is generally dark colored viscous material which after washing may be dried to give a solid varying in color from dark brown to black. The lignosulfonamide is generally soluble in most organic solvents such as in chloroform, benzene and diesel oil, soluble in basic aqueous medium, but insoluble in water. Infrared analyses indicate the presence of sulfonamide groups (7.4μ). The halogen content of the amide will vary depending upon whether the lignosulfonate was pre-halogenated prior to reaction with the acid halide and also whether some halogen substitution of the hydroxyl radical occurred during the acid halide reaction.

The following examples further illustrate the invention and the properties of the product obtained:

EXAMPLE I

A lignosulfonamide was prepared from a fermented calcium base spent sulfite liquor. The liquor was fermented to convert the fermentable sugars to alcohol and stripped to recover the alcohol. The alcohol free liquor was then concentrated and adjusted to a pH of 0–3 and triamylamine was added to precipitate the lignosulfonate as a triamylamine salt. The salt thus obtained was washed with water and dried.

Triamylamine lignosulfonate in an amount of 70 g. was added to a solution containing 150 g. of thionyl chloride and 150 ml. of chloroform, while stirring, and the resulting reaction mixture was refluxed for 3 hours. The solvent, the unreacted thionyl chloride and other volatiles were then flashed off under vacuum. A portion of the resulting intermediate product was washed with water 3 times and analyzed. The product was a brown powder.

A portion of the intermediate product was used for the formation of a sulfonamide. The intermediate product was dispersed in 200 ml. of concentrated $NH_4OH$ and heated for 3 hours at 60–70° C. with stirring. The reaction mixture was then diluted and a precipitate of the sulfonamide was obtained which was washed three times with water. Upon drying, the resulting sulfonamide was obtained which was a brown powder.

The analysis and properties of the intermediate and the sulfonamide products as compared to lignosulfonic acid are shown below.

|  | Lignosulfonic Acid | Intermediate Product, percent | Sulfonamide Product |
|---|---|---|---|
| Percent Cl | 0.0 | 11.0 | 5.2 |
| Percent S | 5.4 | 6.3 | 4.7 |
| Percent N | 0.0 | 1.5 | 2.8 |
| I.R. |  | (1) | (1) |
| Solubilities: |  |  |  |
| Acetone | Very sparingly soluble. | Very soluble | Insoluble. |
| Chloroform | Insoluble | Slightly soluble | Do. |
| Water | Soluble | Insoluble | Do. |
| 10% aqueous NaOH solution | do | Slowly goes into solution upon heating. | Slightly soluble. |

¹ New peaks at 7.4 and 8.4 μ and intensity of —OH peaks of ligno-sulfonic acid is decreased by about one-half.

The nitrogen content in the intermediate product was believed to be in the form of triamylammonium sulfate and triamylammonium chloride which were not removed from the product by washing.

EXAMPLE II

A N-dodecyl-chlorolignosulfonamide was prepared by the reaction of N-dodecylamine with thionyl chloride treated lignosulfonate.

A spray dried fermented calcium base spent sulfite liquor in an amount of 300 g. was dispersed in 1500 ml. of methanol and chlorine in an amount of 100 g. was bubbled into the dispersion at 10° C. The methanol and the resulting hydrochloric acid formed as the result of the chlorine reaction with a spent sulfite liquor was evaporated off at room temperature. The chlorinated spent sulfite liquor obtained after the evaporation of the solvent was dispersed in an equal mixture by weight of butanol and water and triamylamine was added to the mixture until a pH of 5 was obtained. The triamylamine salt of chlorolignosulfonate obtained by the reaction of the triamylamine with the lignosulfonic acid was selectively dissolved in butanol. The butanol layer was washed with water to remove the carbohydrate and other non-lignosulfonate constituents and evaporated to obtain a dried crude amine salt of lignosulfonate. The product was washed twice with diethyl ether and once with petroleum ether and dried.

A portion of the above triamylamine salt in an amount of 20 g. was dissolved in 20 ml. of chloroform, and 10 g. of thionyl chloride was added dropwise with stirring at room temperature. After 3 hours of refluxing, the solvent was flashed off and 35 g. of dodecylamine dissolved in 200 ml. of chloroform was added. The mixture was homogeneous during the two hours of reaction at 50° C. after which the chloroform was flashed off.

The product was purified by dissolving it in a 10 weight percent aqueous sodium hydroxide solution and eliminating the excess amine from the aqueous base by liquid extraction with ether. The basic aqueous solution was then neutralized to precipitate the N-dodecyl-chlorolignosulfonamide product which was washed with water at a pH of 5 to 7. The dry product weighed 18 grams.

The resulting product showed the character of a primary amine sulfonamide being soluble in an aqueous base. When the product was dissolved in an aqueous sodium hydroxide solution and held at room temperature for 16 hours, no insoluble amine was liberated to cloud the solution and none was found when the solution was extracted with diethyl ether. In contrast, an amine salt of lignosulfonate reacts slowly in an aqueous base to form a cloudy mixture of water-soluble sodium lignosulfonate and water-insoluble dodecylamine. The latter can be extracted with ether and obtained as a residue upon evaporation of the ether.

The analysis of the triamylamine chlorolignosulfonate salt and the lignosulfonamide product are shown in the table below.

EXAMPLE II TABLE

|  | Triamylamine Salt of Chlorolignosulfonate | Lignosulfonamide |
|---|---|---|
| Percent: |  |  |
| Methoxyl | 9.5 | 8.0 |
| Organic Cl | 9.1 | 8.5 |
| Inorganic Cl | 0.9 | 0.4 |
| Sulfonate S | 3.2 | 3.2 |
| Nonsulfonate S | 0.2 | 0.7 |
| Total S | 3.5 | 3.5 |
| N | 2.0 | 2.3 |
| Na |  | 0.4 |
| I.R. | Shows the characteristics of amine salt of lignosulfonate. | Shows the characteristics of a sulfonamide of a primary amine. |
| Solubility | Soluble in EtOH. | Slightly soluble in EtOH. |
|  | Soluble in acetone. | Slightly soluble in acetone. |
|  | Very soluble in $CHCl_3$. | Slightly soluble in $CHCl_3$. |
|  | Insoluble in $H_2O$. Gives off amine in aqueous base. | Insoluble in $H_2O$. Soluble in aqueous base and stays homogeneous after overnight. |

EXAMPLE III

A fermented calcium base spent sulfide liquor was chlorinated in a manner similar to that described in Example II, except that 110 g. of chlorine were used per 100 g. of spray dried solids and that after evaporation of the methanol and the hydrochloric acid formed as a result of the chlorination, the chlorinated lignosulfonate was dissolved in a 5% sodium hydroxide solution and allowed to remain at 80° C. overnight while being stirred. the pH of the solution during this time was kept above 12.

From the sodium hydroxide treated solution the lignosulfonate constituents were recovered as the triamylamine salt by the addition of triamylamine after acidification with hydrochloric acid. The triamylamine salt formed was extracted from the solution with chloroform. The chloroform was evaporated and the residue was dissolved in a minimum amount of acetone and the resulting solution was slowly poured into water with agitation to precipitate the triamylamine salt of the chlorinated lignosulfonate. The product was washed with water three times and dried.

To 40 g. of the triamylamine salt of the chlorinated lignosulfonate dissolved in 400 ml. of chloroform, 40 grams of thionyl chloride was added slowly. The reaction mixture was refluxed for 3 hours after which the solvent and the volatiles were flashed off under vacuum. The intermediate product retained as a viscous residue was dissolved in chloroform. Sixty grams of dodecylamine likewise dissolved in chloroform was slowly added to the chloroform solution of the intermediate product. The resulting homogeneous mixture was stirred for 3 hours at 50° C. While the pH of the system was maintained at around 9.

The resulting N-dodecyl chlorolignosulfonamide was recovered from the reaction mixture by evaporating the chloroform and washing with acidic acetone-water mixture three times to remove the excess amine. The chlorolignosulfonamide obtained was a semi-solid product which weighed 41 g. after vacuum drying.

The analysis and properties of the N-dodecyl chlorolignosulfonamide as compared to the triamylamine salt of the sodium hydroxide-treated chlorolignosulfonate are shown in the table below:

|  | Triamylamine salt of the hydrolyzed chlorolignosulfonate | N-dodecylchlorolignosulfonamide |
|---|---|---|
| Percent: |  |  |
| N | 1.65 | 2.89 |
| Na | 0.13 | (¹) |
| Cl (organic) | 9.9 | 8.3 |
| Cl (inorganic) | 0.4 | =0.1 |
| S (sulfonate) | 2.0 | 2.4 |
| S (non-sulfonate) | 0.3 | 0.5 |
| S (total) | 2.1 | 2.6 |
| OMe | 6.4 | 4.4 |
| Reducing sugar | 2.2 |  |
| I.R. | Shows loss of significant amount of aromatic groups. | Shows a small peak at 7.4μ which corresponds to sulfonamide groups. |
| Solubility in: |  |  |
| Chloroform | Soluble | Soluble. |
| Butanol | do | Do. |
| 95% ethanol | do | Slightly soluble. |
| Acetone | do | Do. |
| Ether | Insoluble | Do. |
| Benzene | do | Do. |
| Diesel oil | do | Very slightly soluble and swells. |
| Water | do | Insoluble. |
| 10% of NaOH | Slowly gives off amine and dissolves in. | Slightly soluble and swells in. |

¹ None or trace.

To test the chlorolignosulfonamide as a water-in-oil emulsifier, 10 grams of the chlorolignosulfonamide prepared above was mixed with 200 ml. of diesel oil and about one gram of sodium hydroxide as a 25 weight percent solution. To the mixture, 150 ml. of saturated salt brine was added and the mixture continually mixed for 20 minutes. The stability of the emulsion system was tested by the addition of more saturated brine under the continual mixing until a phase conversion or coagulation of the water-in-oil emulsion was obtained. Seventeen hundred milliliters of the saturated brine was added before the phase conversion or coagulation was obtained. An emulsifier, which will permit addition of more than 1000 ml. before the phase conversion of water-in-oil emulsion, is generally considered as a good emulsifier.

EXAMPLE IV

A N-hexylchlorolignosulfonamide was prepared by the reaction of hexylamine with a thionyl chloride treated lignosulfonate.

A triamylamine salt of a chlorinated lignosulfonate was prepared in a manner similar to that described in Example II.

The dry triamylamine salt of chlorinated lignosulfonate in an amount of 90 g. was dissolved in 600 ml. of chloroform and 42 g. of thionyl chloride were added with stirring at room temperature. The resulting reaction mixture was refluxed for 3 hours after which the solvent and the volatiles were flashed off under vacuum. The intermediate product, as a viscous residue, was obtained which was redissolved in 200 ml. of chloroform, stirred for 10 minutes, and the chloroform was flashed off.

The intermediate product was dissolved in 70 ml. chloroform and 20 g. N-hexylamine, dissolved in 150 ml. chloroform, were added. The resulting mixture was agitated for 3 hours at 40° C. The chloroform was evaporated off, and then the residue was dissolved in a 5% aqueous NaOH solution. Free amines were extracted from the aqueous solution using diethylether. The pH of the aqueous solution was then adjusted to pH 5, using a HCl solution, upon which the N-hexylchlorolignosulfonamide was precipitated. The precipitate was washed three times with water and dried. The resulting product was a brown powder and had the following analysis and properties:

|  | Chlorinated Triamylamine Salt of Lignosulfonates | Intermediate Product | N-hexyl-chlorolignosulfonamide |
|---|---|---|---|
| Percent: |  |  |  |
| N | 1.6 | 1.2 | 2.7 |
| Cl, organic | 9.6 | 12.8 | 10.7 |
| Cl, inorganic | 0.3 | 0.7 | 0.2 |
| Sulfonate S | 3.5 | 3.6 | 3.7 |
| Non-sulfonate S | 0.5 | 1.8 | 0.4 |
| OMe | 7.1 | 7.8 | 8.1 |
| I.R. |  | New peaks at 7.4 and 8.4μ which correspond to those of sulfonyl chlorides. |  |
| Solubilities: |  |  |  |
| Acetone | Soluble | Very soluble | Soluble. |
| CHCl₃ | do | Swells or slightly soluble | Very slightly soluble. |
| Ethanol | do | Soluble | Do. |
| Water | Insoluble | Insoluble | Insoluble. |

EXAMPLE V

A vanillin raffinate obtained upon the oxidation of a fermented calcium base spent sulfite liquor was used in the formation of a N-dodecyl lignosulfonamide.

The vanillin raffinate obtained after recovery of the vanillin was treated with triamylamine to recover the lignosulfonate constituents. The triamylamine salt of the lignosulfonate constituents was extracted from the reaction mixture with chloroform, and the chloroform fraction containing the lignosulfonate was washed twice with water. Upon evaporation of the chloroform, a viscous residue was obtained which was dried under vacuum overnight at 70° C.

The product, obtained in an amount of 70 grams, was dissolved in 400 ml. of chloroform, and 60 grams of thionyl chloride was slowly added with stirring. The reaction mixture was refluxed for 3 hours, after which the solvent and the volatiles were flashed off under vacuum. The intermediate product was obtained as a paste type residue, which was redissolved in chloroform, and 100 grams of dodecylamine also dissolved in chloroform was slowly added with stirring. The resulting homogeneous reaction mixture, after stirring 3 hours at a temperature of 50° C., nad a pH of around 9. The chloroform was evaporated off and the N-dodecyl lignosulfonamide was purified by acidifying, drying and redissolving in benzene. The insolubles, mostly amine-hydrochlorides, were removed by centrifugation.

To illustrate the surface-active properties of the N-dodecyl lignosulfonamide, the product was tested as an emulsifier in water-in-oil systems in a manner similar to that described in Example III. Two thousand milliliters of saturated brine were added before the phase conversion was obtained, indicating that dodecyl lignosulfonamide was an excellent water-in-oil emulsifier.

The analysis and properties of the dodecyl lignosulfonamide and of the triamylamine salt are shown in the table below.

|  | Triamylamine Salt of Vanillin Raffinate | N-dodecyl Lignosulfonamide |
|---|---|---|
| Percent: |  |  |
| N | 4.4 | 3.7 |
| Na | 0.0 | 0.0 |
| OMe | 2.1 | 3.4 |
| Sulfonate S |  | 3.9 |
| Non-sulfonate S | 0.1 | 1.3 |
| Total S | 0.3 | 5.1 |
| Cl (organic) | 0.3 | 0.6 |
| Cl (inorganic) | 9.7 | 3.0 |
| Solubility in: |  |  |
| Chloroform | Soluble | Soluble. |
| Acetone | do | Do. |
| 95% ethanol | do | Slightly soluble. |
| Ether | Insoluble | Do. |
| Benzene | Slightly soluble | Soluble. |
| Diesel oil | Insoluble | Slightly soluble. |
| Water | do | Insoluble. |
| 10% NaOH solution | Dissolves in quickly | Swells in slowly. |

What is claimed is:

1. A process for the preparation of a lignosulfonamide, which comprises intermixing a lignosulfonate with an acid halide selected from the group consisting of thionyl halides, phosphorus pentahalides, phosphorus trihalides, and phosphorus oxyhalides of halogens having an atomic number in the range of 17 through 53 in a non-aqueous solvent wherein said lignosulfonate is soluble to thereby react the lignosulfonate with the acid halide under substantially anhydrous conditions, and intermixing the acid halide reacted lignosulfonate with an amine in a nonaqueous solvent medium to thereby react the acid halide reacted lignosulfonate with the amine to obtain the lignosulfonamide, said amine having a general formula:

wherein $R_1$ represents hydrogen or a methyl radical, and $R_2$ and $R_3$ represent radicals selected from the group consisting of hydrogen, alkyl radicals up to 30 carbon atoms, phenyl radicals, and alkylphenyl radicals having up to the total of 30 carbon atoms.

2. A process, according to claim 1, wherein the lignosulfonate is recovered from a spent sulfite liquor.

3. A process, according to claim 1, wherein the amine reacted with the acid halide reacted lignosulfonate is an alkylamine having from 5 to 20 carbon atoms.

4. A process, according to claim 1, wherein the acid halide is thionyl chloride.

5. A process according to claim 4 wherein the amine is selected from the group consisting of primary and secondary amines.

6. A process for the preparation of lignosulfonamide, which comprises intermixing a lignosulfonate in a stoichiometric excess of thionyl chloride at a temperature in the range of 10° to 80° C., to thereby react the thionyl chloride with the lignosulfonate, removing the unreacted thionyl chloride, intermixing at a temperature in the range of 30° to 70° C. the substantially thionyl chloride-free reaction mixture with an amine in a non-aqueous solvent medium to thereby react the reaction mixture with the amine, said amine having a general formula:

wherein $R_1$ represents hydrogen or a methyl radical, and $R_2$ and $R_3$ represent radicals selected from the group consisting of hydrogen, alkyl radicals up to 30 carbon atoms, phenyl radicals, and alkylphenyl radicals having up to the total of 30 carbon atoms and recovering the lignosulfonamide formed.

7. A process for the preparation of a lignosulfonamide which comprises dissolving a lignosulfonate in chloroform, adding thionyl chloride to the lignosulfonate solution to thereby react the thionyl chloride with the lignosulfonate and subsequently adding an alkylamine having from 5 to 30 carbon atoms to the reaction mixture to thereby react the amine with the reaction mixture to form the lignosulfonamide.

8. A process for the preparation of a lignosulfonamide which comprises separating a lignosulfonate from a sulfonated residual pulping liquor, contacting the lignosulfonate with a halogen having an atomic number in the range of 17 to 35 to prehalogenate the lignosulfonate, intermixing the prehalogenated lignosulfonate with an acid halide selected from the group consisting of thionyl halide, phosphorus pentahalides, phosphorus trihalides, and phosphorus oxyhalides of halogens having an atomic number in the range of 17 to 53 in a non-aqueous solvent wherein said prehalogenated lignosulfonate is soluble to thereby react the lignosulfonate with the acid halide under substantially anhydrous conditions, and intermixing the acid halide reacted lignosulfonate with an amine in a non-aqueous solvent medium to thereby react the acid halide reacted lignosulfonate with the amine to obtain a lignosulfonamide, said amine having a general formula:

wherein $R_1$ represents a hydrogen or a methyl radical, and $R_2$ and $R_3$ represent radicals selected from the group consisting of hydrogen, alkyl radicals up to 30 carbon atoms, phenyl radicals, and alkylphenyl radicals having up to the total of 30 carbon atoms.

9. A process, according to claim 8, wherein the amine is an alkylamine having from 5 to 20 carbon atoms.

10. A process, according to claim 8, wherein the halogen is chlorine, and the acid halide is thionyl chloride.

11. A process, according to claim 10, wherein the amine is an alkylamine having from 5 to 20 carbon atoms.

12. A lignosulfonamide composition comprising a lignosulfonate reacted under substantially anhydrous conditions with an acid halide selected from the group consisting of thionyl halides, phosphorus pentahalides, phosphorus trihalides, and phosphorus oxyhalides of halogens having an atomic number in the range of 17 through 53 in a non-aqueous solvent wherein said lignosulfonate is soluble, and reacting the acid halide reacted lignosulfonate with an amine in a non-aqueous solvent medium, said amine having a general formula:

wherein $R_1$ represents a hydrogen or a methyl radical, and $R_2$ and $R_3$ represent radicals selected from the group consisting of hydrogen, alkyl radicals up to 30 carbon atoms, phenyl radicals, and alkylphenyl radicals having up to the total of 30 carbon atoms.

13. A composition, according to claim 12, wherein the acid halide is a thionyl chloride.

14. A composition, according to claim 13, wherein the amine is an alkylamine having from 5 to 20 carbon atoms.

15. A composition, according to claim 12, wherein the lignosulfonate reacted with the acid halide is pre-halogenated by being contacted with a halogen having an atomic number in the range of 17 to 53.

16. A composition, according to claim 15, wherein the halogen is chlorine and the acid halide is thionyl chloride.

17. A lignosulfonamide composition comprising a lignosulfonate reacted with a thionyl halide and an amine by intermixing the lignosulfonate with a stoichiometric excess of a thionyl halide of a halogen having an atomic number in the range of 17 through 35 to thereby react the lignosulfonate with the thionyl halide at a temperature in the range of 10° to 80° C., removing the unreacted thionyl halide, and intermixing at a temperature in the range of 30° to 70° C. the substantially thionyl halide-free reaction mixture with from 80 to 250 stoichiometric percent of the amine in a non-aqueous solvent medium to react the reaction mixture with the amine, said amine having a general formula:

wherein $R_1$ represents a hydrogen or a methyl radical, and $R_2$ and $R_3$ represent radicals selected from the group consisting of hydrogen, alkyl radicals up to 30 carbon atoms, phenyl radicals, and alkylphenyl radicals having up to the total of 30 carbon atoms.

18. A composition according to claim 17 wherein the thionyl halide is thionyl chloride.

References Cited

Wagner et al., "Syn Org Chem" (1953), pp. 821–823.
Brouns, "Chem of Lignin" (1952), p. 326.

CHARLES B. PARKER, *Primary Examiner.*

D. R. PHILLIPS, *Assistant Examiner.*

U.S. Cl. X.R.

252—8.5, 332